(12) United States Patent
Kurth

(10) Patent No.: US 10,434,581 B2
(45) Date of Patent: Oct. 8, 2019

(54) VIBRATION-DAMPED HIGH-SPEED TOOL HOLDER

(71) Applicant: STRAUMANN HOLDING AG, Basel (CH)

(72) Inventor: Dieter Kurth, Geretsried (DE)

(73) Assignee: STRAUMANN HOLDING AG, Basel (CH)

( * ) Notice: Subject to any disclaimer, the term of this patent is extended or adjusted under 35 U.S.C. 154(b) by 0 days.

(21) Appl. No.: 15/519,691

(22) PCT Filed: Oct. 19, 2015

(86) PCT No.: PCT/EP2015/074161
§ 371 (c)(1),
(2) Date: Apr. 17, 2017

(87) PCT Pub. No.: WO2016/059252
PCT Pub. Date: Apr. 21, 2016

(65) Prior Publication Data
US 2017/0246695 A1   Aug. 31, 2017

(30) Foreign Application Priority Data

Oct. 17, 2014   (EP) .................................... 14189407

(51) Int. Cl.
*B23B 31/117*   (2006.01)
*B23B 31/02*   (2006.01)
(Continued)

(52) U.S. Cl.
CPC .......... *B23B 31/1179* (2013.01); *B23B 31/02* (2013.01); *B23Q 11/1023* (2013.01);
(Continued)

(58) Field of Classification Search
CPC . B23B 31/02; B23B 31/1179; B23B 2250/12; B23B 2250/16; B23B 27/002;
(Continued)

(56) References Cited

U.S. PATENT DOCUMENTS

| 1,192,177 A | * | 7/1916 | Enhinger | ............ B23B 31/1179 |
| | | | | 16/109 |
| 3,230,833 A | * | 1/1966 | Shurtliff | ................ B23B 29/022 |
| | | | | 408/143 |

(Continued)

FOREIGN PATENT DOCUMENTS

DE   202005014350 U1   11/2005
EP       1273396 A2     1/2003
(Continued)

OTHER PUBLICATIONS

Jan. 20, 2016 International Search Report issued with International Patent Application No. PCT/EP2015/074161.
(Continued)

*Primary Examiner* — Eric A Gates
*Assistant Examiner* — Chwen-Wei Su
(74) *Attorney, Agent, or Firm* — Oliff PLC

(57) ABSTRACT

A high-speed tool holder includes: a tool shaft for accommodating a tool at its first end, and a machine clamping part which is integrally connected to the tool shaft and forms an interface for clamping in the machine; with the tool shaft being substantially truncated circular cone-shaped, a first diameter at the first end with the tool insertion opening being smaller than a fifth diameter at the second end at the machine clamping part; and a portion of the substantially truncated circular cone-shaped tool shaft having an outwardly bulging, preferably spherical, shape between the tool insertion opening and the machine clamping part.

15 Claims, 4 Drawing Sheets

(51) Int. Cl.
*B23Q 11/10* (2006.01)
*F16F 7/01* (2006.01)
*F16F 9/30* (2006.01)
*B23B 27/00* (2006.01)

(52) U.S. Cl.
CPC .............. *F16F 7/015* (2013.01); *F16F 9/30* (2013.01); *B23B 27/002* (2013.01); *B23B 2231/0244* (2013.01); *B23B 2231/0288* (2013.01); *B23B 2231/24* (2013.01); *B23B 2250/12* (2013.01); *B23B 2250/16* (2013.01); *B23B 2260/022* (2013.01); *Y10T 408/76* (2015.01); *Y10T 409/304312* (2015.01)

(58) Field of Classification Search
CPC ........ B23B 2231/24; B23B 2231/0244; B23B 2231/0288; B23Q 11/1023; F16F 7/015; F16F 9/30; Y10T 408/76; Y10T 409/304312
See application file for complete search history.

(56) References Cited

U.S. PATENT DOCUMENTS

| | | | |
|---|---|---|---|
| 6,511,077 B1* | 1/2003 | Voss | B23B 31/02 279/102 |
| 7,217,072 B1 | 5/2007 | Haimer | |
| 7,427,179 B2* | 9/2008 | Smith | B23B 31/006 408/143 |
| 8,079,790 B2* | 12/2011 | Volokh | B23B 31/1179 279/102 |
| 8,215,415 B2* | 7/2012 | Lang | B23B 31/005 125/40 |
| 2003/0026669 A1 | 2/2003 | Lang et al. | |
| 2007/0059117 A1 | 3/2007 | Haimer et al. | |
| 2009/0033043 A1 | 2/2009 | Haimer et al. | |
| 2011/0156363 A1* | 6/2011 | Haimer | B23B 31/02 279/20 |
| 2011/0255932 A1* | 10/2011 | Cook | B23C 5/003 409/141 |
| 2011/0318127 A1 | 12/2011 | Freyermuth et al. | |
| 2012/0207560 A1 | 8/2012 | Sakamaki et al. | |

FOREIGN PATENT DOCUMENTS

| | | |
|---|---|---|
| EP | 2399698 A1 | 12/2011 |
| JP | 2001-105208 A | 4/2001 |
| JP | 2003-106295 A | 4/2003 |
| JP | 2007-303714 A | 11/2007 |
| JP | 2008-264978 A | 11/2008 |
| JP | 2009-507651 A | 2/2009 |
| WO | 02/05992 A1 | 1/2002 |

OTHER PUBLICATIONS

Jun. 18, 2019 Office Action issued in Japanese Patent Application No. 2017-520516.

* cited by examiner

VIBRATION-DAMPED HIGH-SPEED TOOL HOLDER

The present invention refers to a high-speed tool holder which is used for accommodating a tool and for being clamped in a machine and which has particularly good vibration-damping due to its special shape.

Conventional high-speed tool holders for accommodating the tool and for clamping in the machine, such as, for instance, in a turning, milling or drilling machine, have an increasing conical diameter from a first end with which the tool is clamped to a second end which is clamped in the machine. This is to arrange as little mass as possible at the front first end where material processing by the tool will take place later on. At the same time, the conical shape, increasing in diameter towards the back region, takes into account a higher bending moment than in the front region and accordingly increases the necessary rigidity. High-speed tool holders are also known which are composed or welded together from different components so as to achieve a specific shape or functionality.

At high speeds and with cutting material, however, oscillations occur within the high-speed tool holder transverse to the longitudinal axis thereof, similar to what happens in a tuning fork; which oscillations cause a tool, such as a milling cutter, to wear off very quickly. The high-speed tool holder is preferably a shrink fit chuck, a tool holder with a screw connector, a hybrid connector or a clamping sleeve. To limit the oscillations, the high-speed tool holders are preferably formed as short as possible which, however, allows only the milling of limited contours and particularly inner contours so that a chuck for the high-speed tool holder does not strike against the workpiece or workpiece holder.

For instance, DE 20 2005 014 350 U1 discloses a tool holder for shrink-on fitting of a tool according to the preamble of Claim 1. However, the tool holder does not provide for any optimization of the damping of lateral vibrations.

Document EP 1 273 396 A2 discloses a tool with enlargements along the tool shaft, the enlargements promoting a vibration behavior in the longitudinal direction of the tool, in particular of a percussion drill tool. High rotational speeds of 20000 rpm to 100000 rpm or more, as with a high-speed tool holder, are not taken into account for the tool, which is a chisel or a percussion drill. The tool is optimized merely with a view to impacting longitudinal forces acting in the direction of the shaft.

Document US 2012 0207 560 A1 discloses a multi-part tool holder which has, in a central shaft portion, a damping means inserted in the tool in an annular direction or by segments and which damps lateral vibrations and ensures a smoother run of the tool. Insertion of the damping means is complicated and difficult to balance, since even minor radial deviations of the damping means on one side will lead to high imbalances and lateral oscillations which can quickly damage the tool and the tool holder and make them unsuitable for use.

To eliminate drawbacks from the state of the art, an aim of the invention is to provide a high-speed tool holder with optimum damping of transverse vibrations along its longitudinal axis and in particular in the front part of the tool connected to a high-speed tool holder. In addition, the high-speed tool holder is intended to be usable also for longer lengths than is possible with the tool holders from the state of the art.

An additional aim is naturally to adapt the high-speed tool holder such that it is easy to manufacture without, for instance, showing imbalances in a first manufacturing step which would have to be removed or compensated for in a subsequent step. Of course, the high-speed tool holder is also intended to be as robust as possible by remaining balanced during operation without displacement, as for instance due to a displacement of screws or similar adjustment means. In this process, a high-speed tool holder is to be manufactured which can do without multi-part components which have been added subsequently and which has no outer elements in form of balancing bodies or screws for reducing the rotational imbalance.

The above aims as well as other aims to be gathered from the specification are achieved by a device according to the features of the independent Claim 1. Other advantageous embodiments of the invention are indicated in the dependent Claims and in the specification.

According to the invention, a high-speed tool holder for accommodating a tool at its first end and for clamping into a machine at its-second end is provided, the ends being arranged on the opposite sides of the longitudinal axis of the high-speed tool holder, the high-speed tool holder comprising a tool shaft formed centrally along the longitudinal axis and defining the first end of the high-speed tool holder, at the first end a tool insertion opening with a first bore for receiving the tool being formed; and a machine clamping part which is also formed centrally along the longitudinal axis and integrally connected with the tool shaft at an end opposite to the first end and which forms an interface for clamping in the machine;

the tool shaft substantially having the form of a truncated circular cone, with a first diameter at the first end with the tool insertion opening being smaller than a fifth diameter at the second end with the machine clamping part; and with a portion of the substantially truncated circular cone-shaped tool shaft between the tool insertion opening and the machine clamping part having an outwardly bulging, preferably spherical shape.

Preferably, the tool shaft is divided along the longitudinal axis into a first, a second and a third portion integrally merging with one another, with the first portion being arranged at the first end having the tool insertion opening, and being formed increasing from a first diameter to a second diameter in the direction leading towards the second portion, substantially in the form of a truncated circular cone, wherein a substantially truncated cone-shaped embodiment is one wherein the truncated cone can optionally have local enlargements;

the second portion corresponding to the portion with the outwardly bulging shape having the second diameter at a location adjacent to the first portion and having a fourth diameter at a location adjacent to the third portion, the fourth diameter being larger than or equal to the second diameter, with the second portion having the outwardly bulging and preferably spherical shape over the length thereof with reference to the longitudinal axis; and the third portion having the fourth diameter at a location adjacent to the second portion and further increasing conically up to the fifth diameter.

For clarity, it is noted that within the context of this invention, the terms "conical" and "truncated cone-shaped" are synonymous with "truncated circular cone-shaped".

According to the invention, the portion with the outwardly bulging shape has a preferably spherical or oval shape along the longitudinal axis. This causes vibrations which are caused by milling and/or forces exerted jerkily from the outside to be damped to a large extent so that they cannot propagate along and transversely to the longitudinal axis. Vibrations induced by, for instance, centrifugal forces, caused by excursions of the first end of the tool shaft which are slightly eccentric due to the oscillations, are prevented or strongly impeded by the geometry of the portion with the outwardly bulging shape from propagating or building up.

Due to a preferably spherical or oval cross-sectional geometry of the portion with the outwardly bulging shape, with a transverse rigidity which correspondingly increases and decreases along the longitudinal axis, vibrations transverse to the longitudinal axis are damped very effectively. An increased inertia of masses of the second portion's enlargement also contributes to vibration damping. However, a reduction in the inertia of masses of the portion with the outwardly bulging shape can also be particularly advantageous, since it can be hollowed out on the inside due to the outwardly bulging contour with the greatly increased rigidity.

Preferably, bores or other types of cavities are provided inside the portion with the outwardly bulging shape and/or in the third portion, so that damping elements such as corpuscular fillers and/or viscous fillers and/or foams can be introduced into these cavities. In particular, a combination of the corpuscular and the viscous fillers is advantageous for vibration damping of the high-speed tool holder.

The dimensions and form geometries mentioned in the Claims and in the detailed description have proved to be particularly advantageous to vibration damping.

Advantageously, the tool insertion opening is formed without an oversize at the first end so that after insertion of the tool, it fits the tool very tightly, counteracting an initial oscillatory excitation.

Preferably, the first portion is formed with an additional enlargement at the tool insertion opening so as to create, close to the insertion of the tool in the high-speed tool holder, a particularly good rigidity and a corresponding retention of the tool therein.

High-speed tool holders with a larger length increase the processing margin for the workpiece. For instance, high-speed tool holders according to the invention can have an overall length of up to 200 mm, for instance 80 to 180 mm, preferably 100 to 140 mm.

Preferably, the tool shaft is adapted for tools with a clamping diameter in the range from 1-10 mm. However, it can also be adapted for tools with a clamping diameter in the range from 1-60 mm or for smaller diameters of, for instance, 0.4 mm, or for larger diameters exceeding 60 mm.

It is also advantageous to provide, inside the high-speed tool holder, at least one internal flow channel extending in the longitudinal direction along the shaft. Through the flow channel, air, a gas, a liquid or a mixture thereof can be conducted or pumped so as to induce, for instance, cooling. The liquid is preferably a cooling liquid. The flow channel can have a corresponding inner contour for swirling the flow medium which is preferably a gas or a liquid or a mixture thereof. Preferably, at least two flow channels are arranged around the first bore. The at least two flow channels preferably overlap with the first bore so that the tool is directly rinsed by the flow medium at the shaft. The fact that the at least two flow channels preferably overlap with the first bore creates supporting webs against the tool which retain the tool. Preferably, the at least two flow channels are open at the front toward the outside at the first end.

In the flow channels or at the exit therefrom, the rotation of the tool holder can cause swirling of the flow medium, which is caused by the flow. The flow channels can have several different functions for different materials to be worked by the tool. One function is cooling, for instance with workpieces made of metal. Another function is the blowing away of abraded particles from the workpiece to be processed by means of the flow medium which is pressed out from the front of the tool insertion opening where the flow channels are open towards the outside. In particular, it is advantageous to blow away particles in this way if zirconium oxides are processed, where cooling can take place at the same time; preferably, the flow medium is air with an atmospheric humidity of 10-20%. By blowing away the abraded particles, such as for instance zirconium oxide particles, with simultaneous cooling, milling can be done much faster. It also helps to avoid cracks or damaged edges at the workpiece. Another positive effect of the flow medium exiting through the flow channels is that the abraded components or particles are blown away from the workpiece and/or from the tool. In this way, a cutting edge is freed from such abraded particles, leading to a longer working life of the tool. The flow medium can also be, for instance, humidified air or distilled water.

Preferably, there are three supporting webs as a three-point support for the tool through the flow channels around the first bore, leading to improved rotation characteristics of the tool.

A preferred embodiment according to the present invention is shown in the subsequent figures and in a detailed specification; however, the invention is not intended to be limited thereto.

DETAILED DESCRIPTION OF THE INVENTION

Figure 1A:
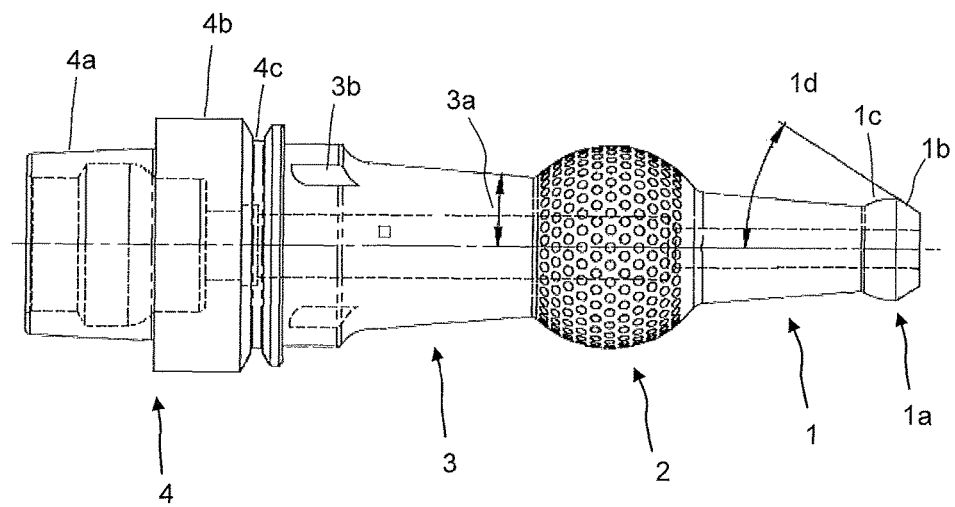
FIG. 1A shows, in a lateral view, a shrink fit chuck as a high-speed tool holder comprising a tool shaft with a first portion into which a tool can be inserted, a second portion with an enlargement and a third portion, comprising, connected integrally to the third portion, a machine clamping part; the first portion having an additional enlargement at a tool insertion opening.

FIGS. 1A, 1B, 2 and 3 show a preferred high-speed tool holder in different views which is formed as a shrink fit chuck. At its first end, the shrink fit chuck has a tool insertion opening 5 for accommodating a tool and at its second end, opposite to the first end with respect to the longitudinal axis, a machine clamping part 4 for clamping in a machine. The shrink fit chuck substantially comprises the machine clamping part 4 and an adjacent tool shaft, which are both formed centrally along and around the longitudinal axis and interconnected integrally. For clarity, it is noted that the longitudinal axis is the central longitudinal axis of the high-speed tool holder.

The machine clamping part 4 forms an interface for clamping in the machine and comprises preferably at its second end a clamping cone 4a, a clamping cylinder 4b and a groove 4c which are adapted to an interface of the machine with which the machine clamping part 4 is supposed to be connected. There are various standards for this purpose which define the clamping cone 4a, the clamping cylinder 4b and its diameter D6.

The tool shaft is an integral continuation of the machine clamping part 4 along the longitudinal axis and has at its first outer end a first bore 1e which forms the tool insertion opening 5 with respect to the outside, so that the tool can be inserted and retained therein. Preferably, the tool shaft is adapted to expand thermally due to heating so that the tool can then be inserted, where with thermal shrinking, caused by subsequent cooling, the tool is retained in a clamped manner. Alternatively, the tool shaft can naturally also be adapted to retain the tool not by thermal clamping but by a different type of mechanical clamping, such as by a threaded connection, a hybrid chuck technology and/or by a clamping sleeve.

According to the invention, the tool shaft is divided, along the longitudinal axis, into a first portion 1, a second portion 2 and a third portion 3 which serially and integrally merge with each other. The first portion 1 is arranged at the first end with the tool insertion opening 5 and substantially formed like a truncated circular cone in the direction towards the second portion 2, increasing from a first diameter D1 to a second diameter D2.

At an interface with the first portion 1, the second portion 2 has the second diameter D2 and at an interface with the third portion 3, a fourth diameter D4 which is larger than the second diameter D2. Between the interface with the second diameter D2 and the interface with the fourth diameter D4, the second portion 2 has an outwardly bulging shape over its length with respect to the longitudinal axis. The outwardly bulging shape of a central part of the second portion 2 is preferably spherical or has an oval cross-section along the longitudinal axis. In or adjacent to the middle of the second portion 2, this portion has a third diameter which is accordingly larger than the second diameter D2 and the fourth diameter D4. Due to its outwardly bulging shape, the second portion has a corresponding rigidity which is particularly advantageous for damping vibrations along the longitudinal axis. The outwardly bulging shape and the additional rigidity provided by it cause the oscillations to largely avoided or damped. Additionally, this shape can cause an increased inertia of masses in order to better absorb and dampen vibrations about the longitudinal axis. Alternatively, however, the outwardly bulging shape can cause both an increased rigidity and a reduced mass in comparison to a form without the outwardly bulging shape, that is, if the second portion 2 would simply transition in a conical form from the second diameter D2 to the fourth diameter D4.

At an interface with the second portion 2, the third portion 3 has the fourth diameter D4 and at an interface with the machine clamping part 4, a fifth diameter D5. Preferably, the diameter of the third portion increases conically from the interface with the second portion 2, which has the fourth diameter D4, to the interface with the machine clamping part 4. Preferably, the conical increase occurs at the same cone angle, for instance an angle of approximately 5 degrees, as in the first portion. At the end of the third portion 3 bordering on the machine clamping part 4, preferably recesses 3b are formed so that the high-speed tool holder can be screwed in and released from the machine more easily.

Preferably, the first portion 1 has the shape of a truncated cone. Preferably, the third portion 3 has the shape of a truncated cone as well.

On the inside, the shrink fit chuck preferably has a bore or a cavity along the longitudinal axis. Preferably, the shrink fit chuck has a first bore 1e in its first portion 1, a second bore 2e in its second portion 2 and a third bore 3e in its third portion 3. Preferably, the bore also extends through the machine clamping part 4 so as to form a continuous channel. Preferably, the continuous channel or the first bore 1e and/or the second bore 2e and/or the third bore 3e are separated by at least one separating element 6a, 6b, 6c. For purposes of clarity, it is noted that a bore can also be a bore with different diameters, which may also comprise a hollow with a conical or spherical or any other shape.

Figure 1B:
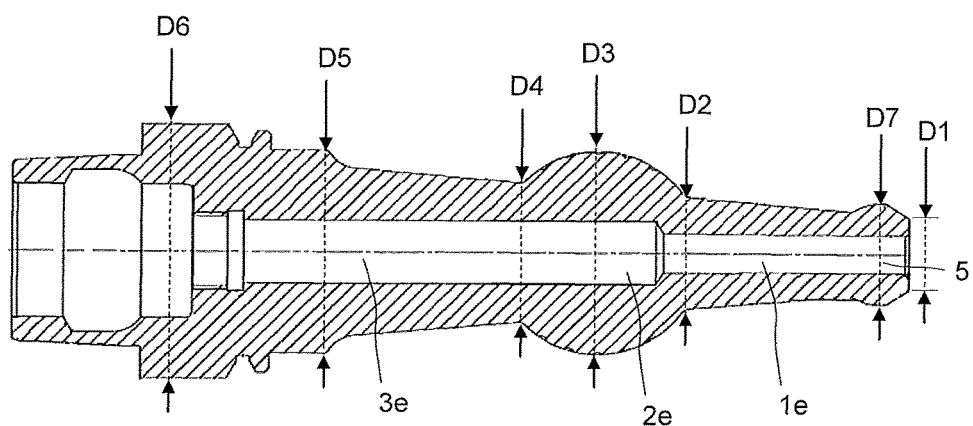
FIG. 1B shows, in a lateral view, the shrink fit chuck of FIG. 1A as a cross-section along the central longitudinal axis, with the first portion having a first bore, the second portion having a second bore and the third portion having a third bore.
Figures 2, 3:
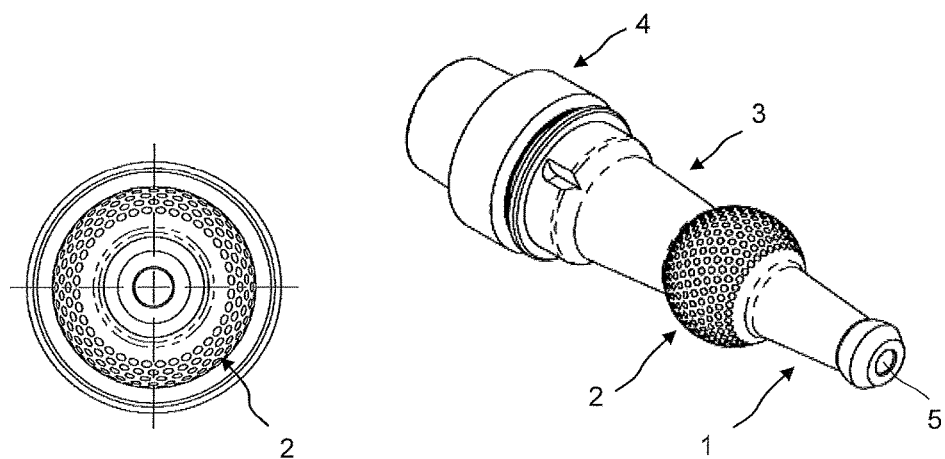
FIG. 2 shows the shrink fit chuck according to FIGS. 1A and 1B in a front view of an outer front face with the tool insertion opening.
FIG. 3 shows the shrink fit chuck according to FIGS. 1A, 1B and 2 in a perspective view.
Figure 4:
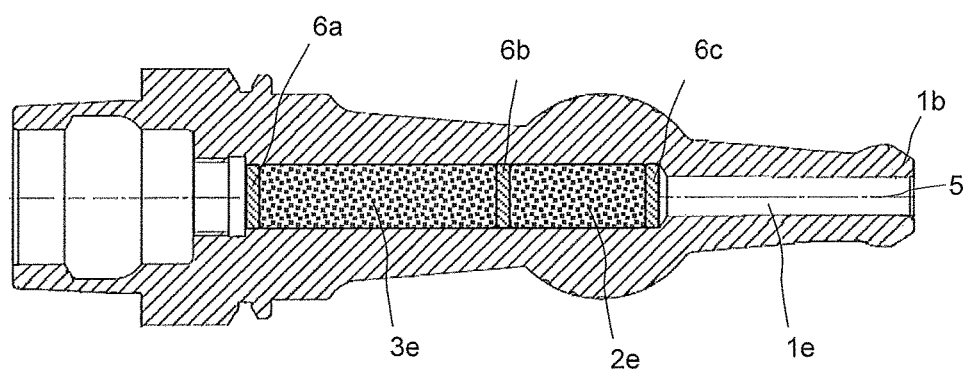
FIG. 4 shows the shrink fit chuck in a cross-section according to FIGS. 1A and 1B, with the second and the third bore being sealed by separating elements and containing filling material on the inside.

FIG. 4 shows an embodiment of the shrink fit chuck according to FIGS. 1-3 where the shrink fit chuck has the second cavity 2e and the third cavity 3e which are separated by the first separating element 6a, the second separating element 6b and the third separating element 6c. It is also conceivable for the first separating element 6a, the second separating element 6b and the third separating element 6c to be located in adjacent portions of the shrink fit chuck. For instance, the third bore 3e of the embodiment shown in FIG. 4 extends into the machine clamping part 4, and accordingly the first separating element 6a is located therein. Preferably, one of the separating elements 6a-6c can also be integrally connected to the shrink fit chuck which has, for instance, not been drilled out but left integral. In the embodiment of FIG. 4, for example, the first separating element 6a is arranged in the machine clamping part 4 and the third bore 3e is extended accordingly. In the third bore 3e, the filler is preferably introduced. Preferably, the second bore is separated from the first bore 1e by the third separating element 6c and therefore closed. In the second bore 2e, preferably another filler or a mixture of fillers is introduced.

Figure 5:
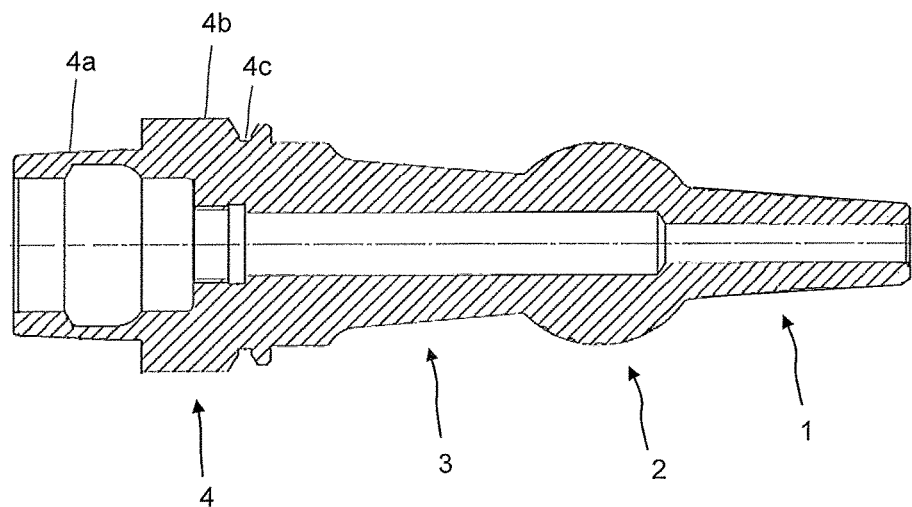
FIG. 5 shows, in a cross-section, another shrink fit chuck similar to the one in FIGS. 1A and B, the first portion having no additional enlargement at the tool insertion opening in this embodiment.

FIG. 5 shows a preferred embodiment of the shrink fit chuck without the additional enlargement 1a in the first portion 1.

The preferred embodiment of the shrink fit chuck according to FIG. 1A and FIG. 1B has at the very beginning of its first distal end, with respect to the machine clamping part 4, an additional enlargement 1a centered with regard to the longitudinal axis, arranged within an outer third or quarter of the first portion. The additional enlargement 1a comprises a first cone 1b which increases from the outer end with the first diameter D1 up to a seventh diameter D7, and a second cone 1c which decreases from the seventh diameter D7 to a diameter in between the first diameter D1 and the second diameter D2. Preferably, the first cone 1b increases with a first cone angle 1d between 30° and 60°. The seventh diameter D7 is larger than the first diameter D1 and the second diameter D2. The additional enlargement 1a is formed such that it clamps the tool at the first end of the first bore 1e with more force than would occur without the enlargement 1a.

Preferably, the first bore 1e is slightly widened at the outer first end where the tool is inserted so that the latter can be inserted more easily. It is even more preferable, however, that the first bore 1e is not widened at the outer first end where the tool is inserted, so that the bore 1e is parallel to the longitudinal axis in the insertion area for the tool so that the tool can be retained more easily in this position and so that vibrations can be better suppressed or even prevented. For this purpose, the tool can be chamfered accordingly so as to be able to be easily inserted in the first bore 1e.

With its shape and with a cross-section which varies along the longitudinal axis, the tool shaft with the first portion 1, the second portion 2 and the third portion 3 is formed such as to ensure optimum rigidity, little overall mass and optimum damping properties for vibrations along the longitudinal axis. For purposes of clarity, it is pointed out that the damping of the vibrations concerns vibrations which can be caused by a fast rotation of the shrink fit chuck about the longitudinal axis and that the vibrations are vibrations transverse to the longitudinal axis, as with a tuning fork. The rotational speed which is typically used lies preferably in the range of 20,000-100,000 rotations per minute (rpm). Sometimes, however, rotational speeds of up to 180,000 rpm are used for which the high-speed tool holder must be adapted. The high rotational speeds allow a high cutting speed and therefore a high advancing speed.

Preferably, the outwardly bulging shape has a surface with a plurality of dents similar to those in the surface of a golf ball. This causes less interfering sound to be produced. In addition, it helps to save material without substantially impairing rigidity of the second portion 2. Thus, therefore, the ratio of rigidity to inertia of masses is optimized. As an alternative, the surface can also be formed with grooves in the direction of the longitudinal axis or transverse thereto, with similar advantages in terms of optimization of rigidity and weight. Other patterns, alternatively to the surface provided with grooves or the golf ball-like surface, are conceivable as well.

Preferably, the outwardly bulging shape of the second portion 2 has a surface larger than would be the case if the surface were smooth. The surface is preferably 20%-50% larger than would be the case if the outwardly bulging shape had a smooth surface.

Preferably, the lengths of the first portion 1, the second portion 2 and the third portion 3 each make up 20-60% of the overall length of the tool shaft, with preferably the lengths of the first and of the second portion together making up less than 50% of the overall length of the tool shaft.

Due to the geometry and kind and due to the good damping properties of the high-speed tool holder, much higher overall lengths are now possible than with conventional high-speed tool holders, allowing a machining of longer milling notches in a workpiece.

Preferably, the second portion 2 in its entirety is arranged in the half portion of the high-speed tool holder which contains the first end. Alternatively and preferably, the second portion 2 in its entirety is arranged in the third of the high-speed tool holder containing the first end.

Preferably, the second portion 2 contains on the inside centrally along the longitudinal axis the second bore 2e or a cavity filled with a filler. The filler is selected such as to ensure optimum additional vibration damping. Preferably, the specific gravity of the filler is less than 50% the specific gravity of the high-speed tool holder material.

Preferably, the third portion 3 contains on the inside centrally along the longitudinal axis the third bore 3e or a cavity filled with a filler. The filler is preferably the one with which the second bore 2e is filled, or it can be a different filler.

Preferably, the second cavity 2e and/or the third cavity 3e or the corresponding bore 2e, 3e are filled with at least one of the following corpuscular fillers or with a combination thereof: steel balls, chromium steel balls, plastic balls, ceramic balls, quartz sand, quartz, sand, aluminum balls, silibead balls, polyamide balls, polycarbonate balls or other corpuscular components. The arrangement of corpuscular fillers in ball bearings without cage is also preferable.

Preferably, the filler of the second bore 2e and/or of the third bore 3e comprises, in addition to the corpuscular fillers, a viscous liquid or foam adapted to cause particularly good vibration damping of the high-speed tool holder.

The high-speed tool holder is preferably formed as a shrink fit chuck. Alternatively, it is formed as a screw connector or hybrid pressure connector with a clamping sleeve which has the above-mentioned characteristics, part of the tool shaft being screwed in from the inside or the major part of the tool shaft or the tool shaft being slotted longitudinally so as to form a clamping sleeve for clamping the tool.

The high-speed tool holder preferably consists of one of the following materials: metals such as steel and in particular damping steel, plastic or a composite material such as a glass fiber composite material.

Preferably, a ventilation bore is also formed in the first portion 1 which connects the cavity of the first bore 1e with the environment.

Preferably, the exterior of the high-speed tool holder is coated to withstand environmental influences.

Preferably, the machine with which the high-speed tool holder is connected is a turning, milling or drilling machine. Oscillations of the high-speed tool holder, especially at high rotational speeds, will destroy the tool easily and quickly so that the machine as well as the high-speed tool holder and the connection between them must be as little prone to oscillations as possible. Oscillations would quickly destroy the tool at the cutting edges. Therefore, the high-speed tool holder is preferably very well-balanced centrally to the longitudinal axis. The vibrational forces which are created by the tool, such as a milling cutter with two cutting edges, transversely to the longitudinal axis and which act on the high-speed tool holder, may only cause as little oscillations as possible or none at all. The high-speed tool holder is adapted to absorb or damp them optimally. With the outwardly protruding shape in the second portion 2 of the high-speed tool holder, rigidity can be increased and at the same time, by means of a cavity or the second bore 2e, a mass of the high-speed tool holder can be reduced.

Preferably, the tool is a milling cutter, a drill, a turning tool, a friction tool, which can be coated or non-coated.

Preferably, the high-speed tool holder is used for the shape cutting of materials, preferably dental materials such as, for example, alloys, such as cobalt-chromium alloys (e.g. Corona), plastics, polyurethanes, aluminum, glass, castings, feldspar ceramics, titanium degrees 1-5 of any kind, hard metals, lead, tin, zinc, copper, zirconium oxides, aluminum oxides, boron carbides, silicon nitrides, silicon carbides, stainless steel, tool steel and different types of case-hardening steel.

Preferably, the high-speed tool holder is made of one piece and without adjusting elements, such as screws or the like, so as to be robust in operation. This avoids the danger of displacement or alteration due to torsion of the adjusting elements during operation, so that the high-speed tool holder remains balanced and a possible imbalance is avoided.

Figure 6:
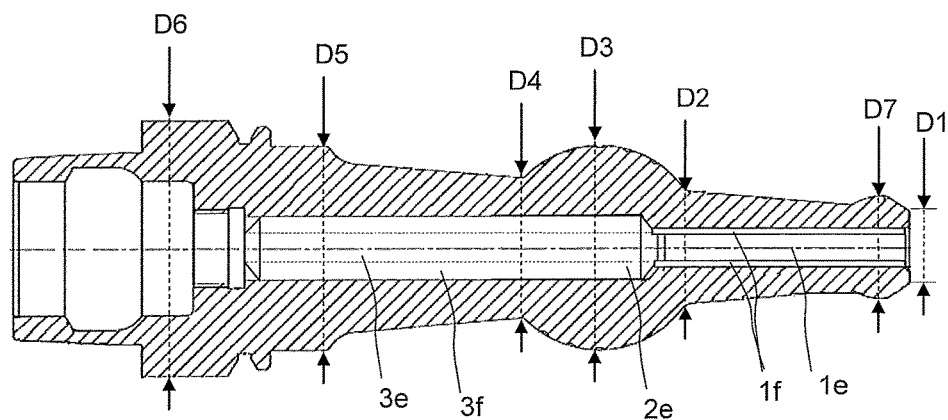
FIG. 6 shows another embodiment of the shrink fit chuck according to one of the above Figures, the shrink fit chuck additionally having flow channels for a gaseous or liquid medium or for a mixture thereof.

As is also shown in FIG. 6, preferably at least one internal flow channel 1f which extends in the longitudinal direction along the shaft is formed in the high-speed tool holder. The flow channel 1f can be formed, for instance, through the cavities mentioned above, or it can be formed in addition. Preferably, the at least one flow channel 1f is formed as a series of flow channels arranged centrally in the shaft and in the longitudinal direction of the shaft. The flow channels 1f are arranged about the central axis of the shaft in such a way that the central axis at the same time is the axis of gravity and the shaft remains balanced. Preferably, the tool shaft is formed such that it has at least one central flow channel (1f) coaxial with the first bore (1e) through which a medium can flow. Preferably, the tool shaft is formed, alternatively or additionally, such that it has at its first end, in parallel to the first bore (1e), at least two flow channels (1f) arranged symmetrically around the first bore (1e) such that the high-speed tool holder remains in balance, the flow channels (1f) being formed such that the medium can flow through them.

Preferably, the flow channel 1f is adjacent to the cavity 3e and connected to it so that a medium can flow through it. The medium can be air, a gas, steam, a liquid or a mixture thereof which is conducted or pumped through it in order to induce, for instance, cooling. Preferably, the liquid is a cooling liquid. The medium is preferably pumped through the flow channels at low pressure or high pressure, in particular at a pressure of 0 to 130 bar.

The cavity 3e as shown in FIGS. 1, 4 and 6, which can also be a bore, preferably has the interior shape of a cage 3f with a first inner diameter at one end, a second inner diameter at the other end and a third inner diameter between the one end and the other, which is larger than the first and the second inner diameter. Preferably, the cavity 3e and the cage 3f are filled with balls or with the filler as described in more detail above. In addition, the cage damps lateral vibrations.

A separate cage is also conceivable which is introduced in the cavity 3e and contains the filling material on the inside so as to better damp the lateral vibrations.

Figure 7A:
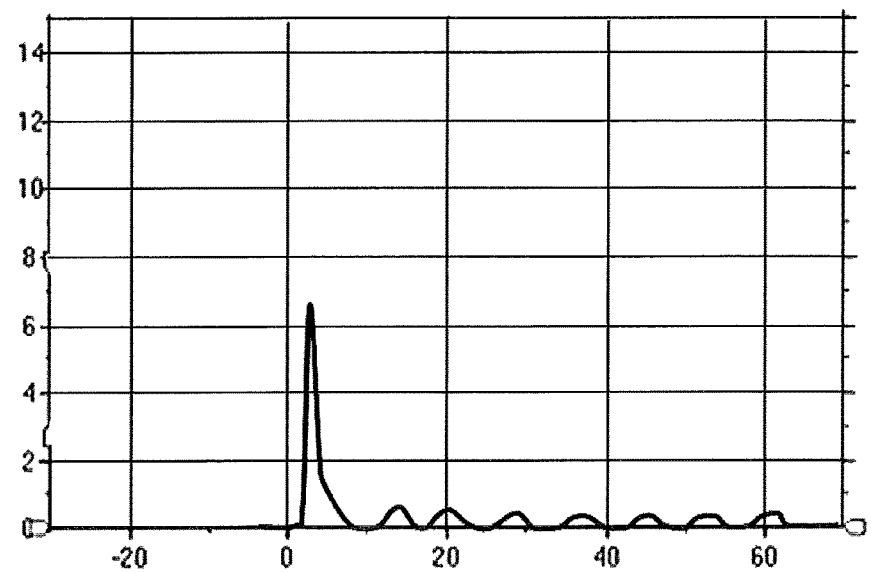
FIG. 7a shows a measurement diagram for a shrink fit chuck according to the present invention.
Figure 7B:
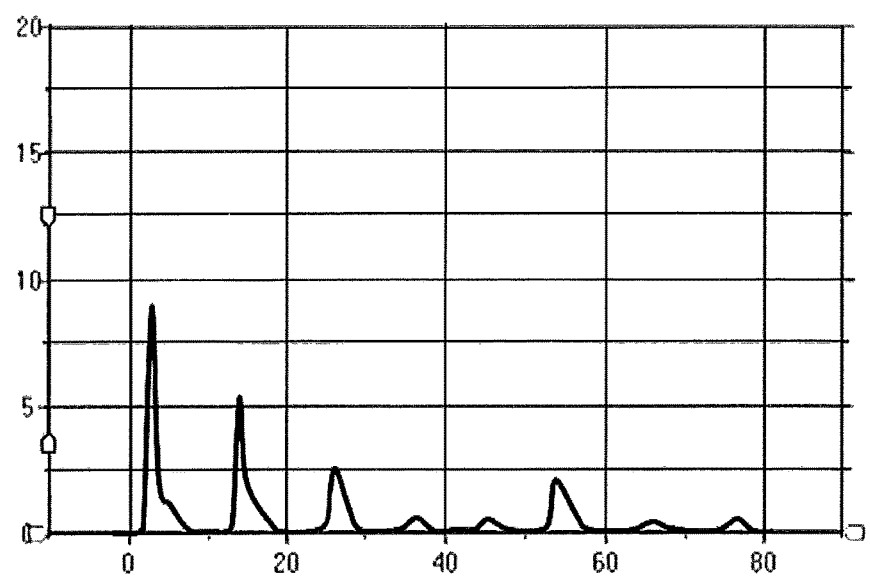
FIG. 7b shows a measurement diagram for a shrink fit chuck which is not part of the present invention; having dimensions identical to those of FIG. 7a, but no outwardly bulging shape in portion 2.

FIG. 7a shows, by way of example, the measured damping behavior of one of the high-speed tool holders according to the invention as a reaction to a lateral, pulse-like excitation. The abscissa represents the time in ms and the ordinate represents the oscillation amplitude. For purposes of comparison, FIG. 7b shows the damping behavior of a high-speed tool holder without the outwardly bulging spherical or oval shape according to the invention at the tool shaft, but with the same excitation conditions as in FIG. 7a. The stronger oscillation behavior and the much slower decay of the oscillations can be clearly seen.

Preferably, transition areas of shapes, such as the outwardly bulging shape of the portion which is spherical or oval, or the shape leading from the fourth to the fifth diameter (D4-D5) of adjacent portions are rounded. The transition areas preferably also have continuous curvatures. For purposes of clarity, it is noted that by "shapes" and by "outwardly bulging shape of the portion", a cross-sectional shape along the longitudinal axis of the high-speed tool holder is understood.

By the "truncated cone shape" of the first and second portion of the shaft, preferably an increasing diameter is understood, from the first diameter D1 to the second diameter D2 and from the fourth diameter D4 to the fifth diameter D5.

Preferably, the first bore 1e is formed with a stop for tool insertion. The bore 1e can also be formed without the stop for tool insertion.

The following materials can be used for the high-speed tool holder: Polyamide, known as nylon 6,6 synthesized, PC, polyamide 12, also known as FDM nylon, ABS, polyetherimides, polycarbonates, polysulphones, a composite material such as, for example, a glass fiber composite material. The structural shapes of the materials mentioned are not limited in the embodiment. The structural shapes of the material(s) preferably comprise basic fibers, at least one film, granules, disks, tubes, a rod shape or components thereof. The materials have trade names such as, for instance, Ultem, Capron, Nylacasr, Endur, Nylon 12, Orgamid, Fortus, Akulon K and Akulon F. The high-speed tool holder preferably consists of the copolymers nylon 6/66 with individual or mixed components. The composition can have different structures and/or it can consist of components with mixed chemical structures. Preferably, a metallurgic material is used as a preferably form-fitting composite with polyamide, nylon 6,6 synthesized, PC, polyamides 12, FDM nylon, ABS, polyetherimides, polycarbonates and/or polysulphones.

Other possible embodiments are described in the subsequent claims. In particular, the various characteristics of the above-described embodiments can be combined, provided that they are not mutually technically exclusive.

For purposes of clarity, it is noted that within the context of this specification and the Claims, the "second portion 2" is equivalent in meaning to the "portion of the substantially truncated circular cone-shaped tool shaft between the tool insertion opening and the machine clamping part with an outwardly bulging, preferably spherical shape" or, in short, to the "portion with the outwardly bulging shape". The first portion 1 is thus equivalent to another portion of the tool shaft which forms the outer end of the tool shaft at the tool insertion opening 5 and which is integrally connected to the portion with the outwardly bulging shape. The third portion 3 is equivalent to yet another portion of the tool shaft which is integrally adjacent to the portion with the outwardly bulging shape and connected at the other end to the machine clamping part.

The reference numbers given in the Claims are for better comprehensibility, but do not limit the Claims to the embodiments shown in the Figures.

LIST OF REFERENCE NUMBERS 1 first portion of the tool shaft
1a additional enlargement
1b first cone
1c second cone
1d first cone angle of the first cone towards the central axis
1e first bore (of the second part of the tool shaft)
1f flow channel
2 second portion of the tool shaft
2e second bore
3 third portion of the tool shaft
3a cone angle
3b recess
3e third bore
3f cage
4 machine clamping part
4a clamping cone
4b clamping cylinder
4c groove
5 tool insertion opening
6a first separating element
6b second separating element
6c third separating element D1-D7 first-seventh diameter

The invention claimed is:

1. High-speed tool holder for accommodating a tool at its first end and for clamping it into a machine at its second end, the ends being arranged on the opposite sides of the longitudinal axis of the high-speed tool holder, the high-speed tool holder comprising:
   a) a tool shaft which is formed centrally along the longitudinal axis and defines the first end of the high-speed tool holder, a tool insertion opening (5) with a first bore (1e) for accommodating the tool being formed at the first end, and
   b) a machine clamping part (4) which is also formed centrally along the longitudinal axis and integrally connected to the tool shaft at an end opposite to the first end, and which forms an interface for clamping into the machine,
   c) the tool shaft being substantially truncated circular cone-shaped, with a first diameter (D1) at the first end with the tool insertion opening being smaller than a fifth diameter (D5) at the second end at the machine clamping part, and characterized in that
   d) a portion of the substantially truncated circular cone-shaped tool shaft having an outwardly bulging spherical or oval shape between the tool insertion opening and the machine clamping part, resulting in an additional material volume between the substantially truncated circular cone-shaped tool shaft and the outwardly bulging shape.

2. High-speed tool holder according to claim 1, the tool shaft being divided along the longitudinal axis into a first (1), a second (2) and a third portion (3) serially merging with one another integrally, with
   the first portion (1) being arranged at the first end with the tool insertion opening (5) and being substantially increasing in truncated circular cone-shape in the direction towards the second portion (2) from the first diameter (D1) to a second diameter (D2);
   the second portion (2) which corresponds to the portion with the outwardly bulging shape having the second diameter (D2) at a location bordering on the first portion (1) and having a fourth diameter (D4) larger than or equal to the second diameter (D2) at a location bordering on the third portion (3), with the second portion (2), over its length, having the outwardly bulging spherical shape with respect to the longitudinal axis; and
   the third portion (3) having the fourth diameter (D4) at a location bordering on the second portion (2) and further increasing conically up to the fifth diameter (D5).

3. High-speed tool holder according to claim 2, wherein the lengths of the first portion (1), the second portion (2) and the third portion (3) each make up 20-60% of the overall length of the tool shaft; or
   wherein a length of the first and of the second portion taken together amounts to less than 50% of the overall length of the tool shaft; or
   wherein the second portion (2) is entirely arranged in the half of the high-speed tool holder which contains the first end; or
   wherein the second portion (2) is entirely arranged in the third of the high-speed tool holder which contains the first end.

4. High-speed tool holder according to claim 2, the third portion (3) having on the inside centrally along the longitudinal axis a third bore (3e) or a cavity filled with an additional filler.

5. High-speed tool holder according to claim 2, the first portion (1) having, at the first end behind the first diameter (D1) along the longitudinal axis, an additional enlargement (1a) with a seventh diameter (D7), the enlargement (1a) first increasing from the first diameter (D1), then decreasing behind the seventh diameter (D7) and then conically increasing continuously up to the second diameter (D2) at the transition to the second portion (2), wherein the additional enlargement (1a) is adapted to cause locally a higher rigidity and thus a sufficiently strong clamping of the workpiece.

6. High-speed tool holder according to claim 1, the outwardly bulging shape having a surface with a plurality of dents which are formed similar to the surface of a golf ball or which are groove-shaped transversely to the longitudinal axis or groove-shaped in the direction of the longitudinal axis.

7. High-speed tool holder according to claim 1, wherein the outwardly bulging shape of the second portion (2) is formed with a surface which is at least 30% larger than would be the case if the outwardly bulging shape had a smooth surface.

8. High-speed tool holder according to claim 1, the portion with the outwardly bulging shape having on the inside centrally along the longitudinal axis a second bore (2e) or a cavity filled with a filler.

9. High-speed tool holder according to claim 8, wherein the filler of the second and/or of the third bore (2e, 3e) comprises one of the following corpuscular fillers or a combination thereof, selected from the group comprising steel balls, chromium steel balls, plastic balls, ceramic balls, quartz sand, quartz, sand, aluminum balls, silibead balls, polyamide balls, polycarbonate balls or other corpuscular components.

10. High-speed tool holder according to claim 9, wherein the filler of the second and/or of the third bore (2e, 3e) comprises, in addition to the at least one corpuscular filler, a viscous liquid or foam which are intended to cause a particularly good vibration damping of the high-speed tool holder.

11. High-speed tool holder according to claim 1, the high-speed tool holder being formed as a shrink fit chuck wherein the tool shaft clampingly retains the tool by thermal expansion and shrinking or which is adapted to clampingly retain the tool by a screw connector and a clamping sleeve.

12. High-speed tool holder according to o claim 1, which consists of one of the following materials selected from the group comprising metal, plastic, a composite material, a glass fiber composite material, nylon, 6,6 synthesized, PC, polyamides 12, FDM nylon, ABS, polyetherimides, polycarbonates and/or polysulphones.

13. High-speed tool holder according to claim 1, the high-speed tool holder being adapted for clamping in a turning, milling or drilling machine.

14. High-speed tool holder according to claim 1, where the tool is a milling cutter, a drill, a turning tool or a friction tool which is non-coated, coated or anticorrosively coated.

15. High-speed tool holder according to claim 1,
   wherein the first bore (1e) is formed sufficiently wide and continuous so that the tool can be inserted therein without a stop; or
   wherein the tool shaft is adapted such that it has, coaxial with the first bore (1e), at least one centric flow channel (1f) through which a medium can flow; or
   wherein the tool shaft is adapted such that it has, at the first end parallel to the first bore (1e), at least two flow channels (1f) arranged about the first bore (1e) symmetrically such that the high-speed tool holder remains balanced, the flow channels (**1*f*) being formed such that a medium can flow through them; or wherein the tool shaft is adapted such that it has, at the first end parallel to the first bore (1*e*), at least two flow channels (1*f*) which are arranged about the first bore (1*e*) symmetrically and intersect the first bore (1*e*) so that by non-intersected parts of the first bore (1*e***), supporting webs for supporting and clamping the tool are formed, the at least two flow channels being open at the first end towards the tool in order to let a medium flow through;

the medium being a gas, air, steam, a liquid, a cooling liquid or a mixture thereof.

* * * * *